United States Patent Office 2,931,119
Patented Apr. 5, 1960

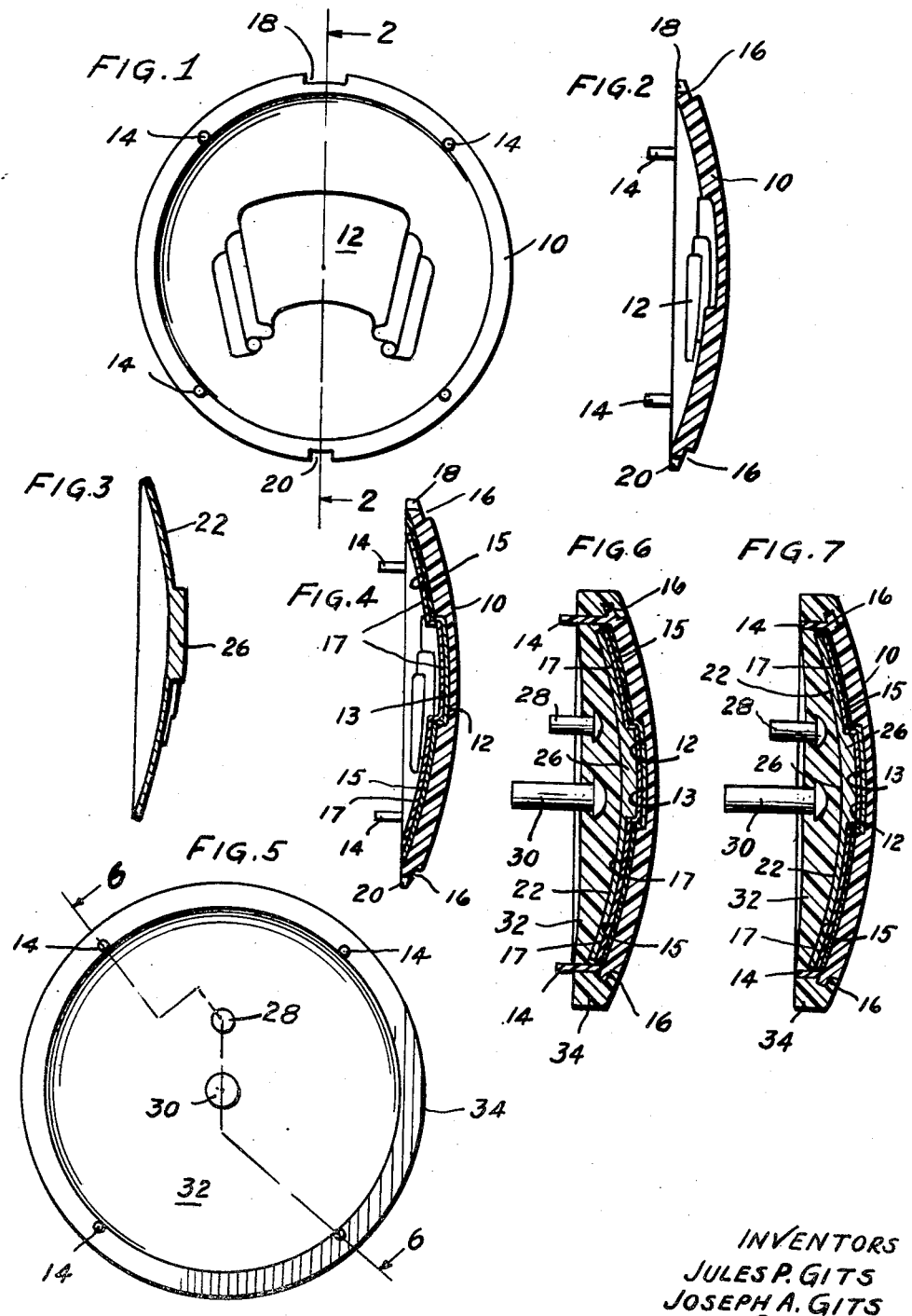

2,931,119

MOLDED ARTICLE AND METHOD OF MAKING SAME

Jules Paul Gits and Joseph Anthony Gits, Chicago, Ill.

Application June 1, 1953, Serial No. 358,598

4 Claims. (Cl. 41—22)

This invention relates to improvements in molded article and method of making same. More particularly this invention relates to improvements in methods of making backings for plastic articles. It is therefore an object of the present invention to provide an improved backing for plastic articles.

In the manufacture of plastic articles, it is frequently desirable to color portions of those articles. While it might seem possible to provide the articles with colored portions on the outer surfaces thereof, such a plan is actually impractical. Those colored portions would be subject to chipping when contacted by foreign bodies. As a result, it has become desirable to provide colored portions for plastic articles at the back of those articles and to cover and protect those colored portions. The colored portions can then be viewed through the article itself; such articles being of transparent plastic material.

The colored portions of transparent articles which have the colored portions thereof on the rear surfaces, are customarily protected by a metal mounting for the article. This metal mounting overlies the entire rear surface of the article and has mounting studs formed as a part of it. The outer edges of the metal backing are spun over the edges of the plastic article and thus lock it in position relative to the metal backing. While such backings have proved useful, they are expensive and do not provide a fully adequate bond with the plastic articles. For this reason, prior metallic backings for plastic articles are objectionable. The present invention obviates these objections by providing a plastic backing for plastic articles which can be molded integrally with those articles. Where this is done, there is no possibility of the article becoming separated from its backing, and a completely weather tight and dust proof article is produced. It is therefore an object of the present invention to provide a plastic backing for transparent, colored plastic articles.

The colored portions on the rear surfaces of the plastic articles are customarily covered with a protective coating of paint. However, that protective coating of paint would be unable to directly stand the high temperatures and pressures that are required in molding the plastic backing to the transparent plastic articles. The present invention protects that coating from direct contact with the plastic of the plastic backing and thus isolates that coating and the colors which it protects from the temperatures and pressures of the plastic coating. The present invention does this by interposing a body of material between the protective coating on the back of the transparent article and the plastic material which is molded to form the backing for that article. This intermediate body thus permits the integral molding of the plastic backing for the article without any injury to the colors on the plastic article or to the protective coating over those colors.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing:

Fig. 1 is a rear elevational view of a plastic article which can have colors formed on the rear surface thereof, Fig. 2 is a cross sectional side view of the article of Fig. 1, and it is taken along the plane indicated by the line 2—2 in Fig. 1, Fig. 3 is a cross sectional side view of an intermediate body that can be placed adjacent the rear face of the article of Figs. 1 and 2 and which will insulate that face from direct contact with the material of the plastic backing to be molded onto that article, Fig. 4 is a cross sectional side view of the article of Figs. 1 and 2 after colors and paint have been applied to the rear face thereof, Fig. 5 is a rear elevational view of the article of Figs. 1 and 2 after it has had a plastic backing molded on to it, Fig. 6 is a cross sectional view of the article and backing of Fig. 5, and it is taken along the broken plane indicated by the line 6—6 in Fig. 5, and Fig. 7 is the cross sectional side view of Fig. 6 after the locking projections of the molded article have been ground off.

Referring to the drawing in detail, the numeral 10 generally denotes a transparent article of plastic material. Such materials are commercially available and can be molded by processes known to those skilled in the art. The article 10 has an ornamental recess 12 formed in the back thereof and that recess can be colored any desired color 13. The rest of the back of the article 10 will preferably be colored with a different color 15 to provide a pleasing and attractive contrast. In actual practice the back of the article may have a number of different designs formed on it and those designs may have many, rather than just two colors 13 and 15 on them. The colors 13 and 15 may be applied in a number of different ways and they will preferably be covered with a protective coating such as aluminum paint 17. Four pin-like locking projections 14 are formed on the rear surface of the article 10. These projections extend rearwardly from the rear face of the article 10 and will lock that article to the plastic backing which will be molded onto that article. An annular recess 16 is formed at the edge of the article 10 and that recess extends around the periphery of that article. A rather wide notch 18 is formed in the periphery of the article 10 at the top thereof and a narrower notch 20 is formed in the periphery of the article 10 at the bottom thereof. These notches will serve to facilitate the mounting of the article 10 in a mounting frame and will secure the desired registry of the articles and other items of equipment.

The numeral 22 denotes an intermediate body which can be disposed in intimate engagement with the rear face of the article 10. This insert will preferably be made of a thermally insulating material, such as paper, cardboard, plastic or the like. However, if desired, the body 22 can be made of metal. The body 22 will either be bent or pressed to have a configuration which is complementary to the rear surface of the article 10. Thus the article 22 will have a design 26 thereon which will register with and be complementary to the recess 12 in the article 10. The design can be pre-formed in the body 22 or it can be formed as that body is pressed into intimate engagement with the rear surface of the article 10. Where the body is of a soft material such as paper, it will be feasible to press and form the body at the time it is placed against the back of the article 10, but where the body 22 is of metal, it will be preferable to pre-form that body.

The numeral 28 denotes a small mounting stud and the numeral 30 denotes a larger mounting stud. These studs have enlarged heads and those heads will be held adjacent the rear of the intermediate body 22 by the molding equipment in which the plastic backing for the article 10 is formed. The material of the backing 32 will be heated until that material can flow, and then that material will be directed into a mold which contains the article 10 and which holds the studs 28 and 30 adjacent the rear of the intermediate body 22 which is lying against the rear of the article 10. The heated plastic material will strike the rear of the intermediate body 22 and will then be deflected to the various portions of the mold and will fill those portions. The material of the backing 32 will surround the locking projections 14 and will flow around the periphery of the article 10 and fill the annular recess 16. That material will also fill the notches 18 and 20 in the periphery of the article 10. Furthermore, the plastic material of the backing 32 will surround the enlarged heads of the studs 28 and 30 and will permanently anchor those studs relative to the article 10. In addition, the plastic material will flow outwardly and will be caused to form a smooth rim 34 by the mold.

The bond between the plastic backing 34 and the article 10 will be waterproof, dustproof and permanent. The pressure under which the material of the backing 32 is introduced into the mold is quite high and it will positively force the intermediate body 22 against the rear of the article 10; and this will keep any plastic material from slipping between the intermediate body 22 and the rear of the article 10. The intermediate body 22 will protect the colors 13 and 15 on the rear surface of the article 10 from the effects of the heat and pressure of the backing 32 in one of two ways. Where the intermediate body 22 is of a thermally insulating material, it will retard the passage of heat to the colors 13 and 15 on the rear of the article 10 until that heat has dissipated to the mold. Thus the overall temperature of the colors 13 and 15 on the rear of the article 10 cannot rise to levels which are injurious. Where the intermediate body 22 is of metal, that metal will conduct the heat away from the point opposite the injection opening of the mold and will thus tend to equalize the heat applied to the colors 13 and 15 on the rear of the article 10. This rapid conduction of heat is sufficient to keep the temperature at any one place on the rear of the article 10 from rising to levels that would injure the colors 13 and 15 on the rear face of article 10. Thus, in both instances, the intermediate body 22 fully protects the colors 13 and 15 on the rear surfaces of the article 10.

Once the plastic backing 32 has been united with the article 10, the overall unit is removed from the mold and the portions of the projections 14 which extend rearwardly of the plastic backing 32 can be ground or cut off. The appearance of the overall article after those projections have been ground or cut off is best shown in Fig. 7. The overall article has the mounting studs positively secured therein and it is a light weight, permanently bonded, waterproof and dustproof article of pleasing appearance.

Whereas the drawing and accompanying description have shown and described a preferred embodiment of the present invention, it should be apparent to those skilled in the art art that various changes may be made in the form of the invention without affecting the scope thereof.

What we claim is:

1. A plastic article that comprises a front piece of transparent plastic, color-receiving areas at the rear face of said front piece, at least one of said color-receiving areas being recessed relative to the other color-receiving areas to provide an uneven surface for said rear face of said front piece, heat-sensitive color on said color-receiving areas at said rear face of said front piece, an intermediate body that is in engagement with and protects said heat-sensitive color on said color-receiving areas at said rear face of said front piece, a homogeneous and unitary backing that engages and underlies all of the rear face of said intermediate body and extends outwardly beyond the periphery of said intermediate body and extends outwardly beyond the periphery of said front piece and extends forwardly to and is bonded in a peripheral groove in the front face of said front piece, said backing overlying the periphery of said front piece and extending inwardly from said periphery of said front piece to define an overlying and encasing annulus in said peripheral groove in the front face of said front piece, said intermediate body being complementary to and abutting said uneven surface on said rear face of said front piece, said intermediate body defining a continuous area that keeps a corresponding area on the rear of said front piece wholly free of said backing.

2. The method of making plastic articles that comprises molding a front piece which has a plurality of color-receiving areas on the rear thereof, said areas being spaced at different distances from the front of said front piece, applying heat-sensitive color to said color-receiving areas, forming an intermediate body with a plurality of areas thereon which are complementary to said areas on said front piece, placing said intermediate body in engagement with the rear face of said front piece, directing molten plastic material against the rear of said intermediate body to force said intermediate body into such intimate engagement with said rear face of said front piece that said molten plastic material can not move in front of and engage the front face of said intermediate body and continuing to direct said molten plastic material against said rear of said intermediate body to distribute said molten plastic material outwardly to underlie all parts of said intermediate body and outwardly beyond the periphery of said intermediate body and forwardly to said front piece to form a backing that lockingly engages with said front piece to encase and enclose said intermediate body, and permitting the first said and said additional molten plastic material to solidify and bond to said front piece.

3. The method of making colored plastic articles that comprises molding a front piece of transparent plastic material so it has a rear face with at least one recess therein and so it has a peripheral groove in the front face thereof, said recess being one of a plurality of color-receiving areas on said rear face of said front piece, said color-receiving areas on said rear face being spaced different distances from said front face of said front piece, applying heat-sensitive color to said color-receiving areas, forming an intermediate body with at least one projection on the front face thereof so said front face of said intermediate body is complementary to said rear face of said front piece and so said intermediate body underlies and masks and protects said color-receiving areas on said rear face of said front piece, placing said front face of said intermediate body in engagement with said rear face of said front piece so the said projection thereon extends into the recess in said rear face of said front piece, directing molten plastic material against the rear face of said intermediate body to force said intermediate body into such intimate engagement with said rear face of said front piece that said molten plastic material can not move in front of and engage the front face of said intermediate body and continuing to direct said molten plastic material against said rear face of said intermediate body to distribute said molten plastic material outwardly into engagement with the entire said rear face of said intermediate body and outwardly beyond the periphery of said intermediate body and beyond the periphery of said front piece and forwardly into said peripheral groove in said front face of said front piece to form an integral backing that extends from said peripheral groove in said front face of said front piece to, and underlies all of, the rear faces of said intermediate body and of said front piece, said backing coacting with said front piece to completely encase and enclose said color-receiving areas and said intermediate body, and permitting the molten plastic material to solidify and bond to said front piece.

4. The method of making colored plastic articles that comprises molding a front piece of transparent plastic material so it has a rear face with color-receiving areas thereon and so it has a peripheral groove in the front face thereof, at least one of said color-receiving areas being recessed to provide an uneven surface for said rear face of said front piece, applying heat-sensitive color to said color-receiving areas, forming an intermediate body with a front face that is complementary to said rear face of said front piece and so said intermediate body underlies and masks and protects said color-receiving areas on said rear face of said front piece, placing said front face of said intermediate body in engagement with said rear face of said front piece, directing molten plastic material against the rear face of said intermediate body to force said intermediate body into such intimate engagement with said rear face of said front piece that said molten plastic material can not move in front of and engage the front face of said intermediate body and continuing to direct said molten plastic material against said rear face of said intermediate body to distribute said molten plastic material outwardly into engagement with the entire said rear face of said intermediate body and outwardly beyond the periphery of said intermediate body and beyond the periphery of said front piece and forwardly into said peripheral groove in said front face of said front piece to form an integral backing that extends from said peripheral groove in said front face of said front piece to, and underlies all of, the rear faces of said intermediate body and of said front piece, and permitting said molten plastic material to solidify and bond to said front piece.

References Cited in the file of this patent

UNITED STATES PATENTS

| | | |
|---|---|---|
| 1,881,038 | Whitehouse | Oct. 4, 1932 |
| 2,163,814 | Swarovski | June 27, 1939 |
| 2,175,840 | Isasi | Oct. 10, 1939 |
| 2,354,857 | Gits | Aug. 1, 1944 |
| 2,451,913 | Brice | Oct. 19, 1948 |
| 2,458,327 | Wood | Jan. 4, 1949 |
| 2,586,978 | Murray | Feb. 26, 1952 |
| 2,781,597 | Doane | Feb. 19, 1957 |